United States Patent
Yagyu et al.

[11] Patent Number: 6,014,607
[45] Date of Patent: Jan. 11, 2000

[54] METHOD AND APPARATUS FOR SEARCHING A ROUTE

[75] Inventors: Takeshi Yagyu; Yasuhiro Ihara, both of Osaka; Yoshiki Ueyama, Sakai, all of Japan

[73] Assignee: Matsushita Electric Industrial Co., Ltd., Osaka-fu, Japan

[21] Appl. No.: 08/936,914

[22] Filed: Sep. 25, 1997

[30] Foreign Application Priority Data

Sep. 30, 1996 [JP] Japan .................................. 8-259747

[51] Int. Cl.⁷ .................................................. G01C 21/00
[52] U.S. Cl. ........................ 701/202; 701/209; 340/990; 340/995
[58] Field of Search .................................. 701/200, 202, 701/207, 208, 209, 210; 73/178 R; 340/988, 990, 995

[56] References Cited

U.S. PATENT DOCUMENTS

| | | | |
|---|---|---|---|
| 4,937,753 | 6/1990 | Yamada | 701/209 |
| 4,962,458 | 10/1990 | Verstraete | 701/202 |
| 4,984,168 | 1/1991 | Neukrichner et al. | 340/995 |
| 5,475,598 | 12/1995 | Fushimi et al. | 701/209 |
| 5,502,640 | 3/1996 | Yagyu et al. | 701/202 |
| 5,506,779 | 4/1996 | Kanki | 701/202 |
| 5,513,110 | 4/1996 | Fujita et al. | 340/995 |
| 5,845,228 | 12/1998 | Uekawa et al. | 701/202 |

FOREIGN PATENT DOCUMENTS

| | | |
|---|---|---|
| 0 790 486 | 8/1987 | European Pat. Off. . |
| 0 246 452 | 11/1987 | European Pat. Off. . |
| 0 261 450 | 3/1988 | European Pat. Off. . |
| 59-105113 | 6/1984 | Japan . |
| 2-56591 | 2/1990 | Japan . |
| 3-54590 | 3/1991 | Japan . |
| 4-204482 | 7/1992 | Japan . |

OTHER PUBLICATIONS

Guzolek J. et al.: "Real–Time Route Planning in Road Networks", Proceedings of the Vehicle Navigation and Information Systems Conference (VNIS), Toronto, Sep. 11–13, 1989.

Aho, Alfred V., *Data Structures and Algorithms*, Trans. Yoshio Ono, Kabushiki Kaisha Baifu–kan, 19990, pp. 179–183.

*Primary Examiner*—Gary Chin
*Attorney, Agent, or Firm*—Wenderoth, Lind & Ponack, L.L.P.

[57] ABSTRACT

Road network data is divided into a plurality of road network areas and one or a plurality of routes are obtained between the divided road network areas. The obtained routes are stored into a route data storage device 1. When a starting point and a destination are specified from a point input device 2, an area investigating device 3 investigates two road network areas to which the points belong. A route retrieving device 4 retrieves the route data corresponding to the combination of the obtained two road network areas from the route data storage device 1. A peripheral route searching device 8 searches for connecting routes in the road network areas to which the starting point and the destination belong, on the basis of the road network data stored in the road network data storage device 7. Further, the peripheral route searching device 8 produces the entire route from the starting point to the destination by using the route data retrieved from the route data storage device 1 and the connecting routes searched for in the vicinities of the starting point and the destination and presents the route to a user through an output device 6. This way, routes between arbitrary two road network areas are obtained in advance and stored as route data. When a starting point and a destination are specified, the route data between the corresponding road network areas are retrieved and a route from the starting point to the destination is presented on the basis of the retrieved route data. Thus the route can be searched for in an instant.

7 Claims, 9 Drawing Sheets

SHORT DISTANCE

INTERMEDIATE DISTANCE

LONG DISTANCE

FIG. 16A

| |
|---|
| 1 |
| 2 |
| 3 |
| 4 |
| 5 |
| 6 |
| ⋮ |

FIG. 16B

| |
|---|
| ⋮ |
| 5 |
| 6 |
| 9 |
| 10 |
| 9 |
| 10 |
| 13 |
| 14 |
| 2 |
| 3 |
| 6 |
| 7 |
| 6 |
| 7 |
| 10 |
| 11 |
| 10 |
| 11 |
| 14 |
| 15 |
| ⋮ |

FIG. 16C

| |
|---|
| ⋮ |
| 5 |
| 6 |
| 9 |
| 10 |
| 13 |
| 14 |
| 2 |
| 3 |
| 6 |
| 7 |
| 10 |
| 11 |
| 14 |
| 15 |
| ⋮ |

FIG. 16D

| |
|---|
| ⋮ |
| 5, 6, 9, 10 |
| 9, 10, 13, 14 |
| 2, 3, 6, 7 |
| 6, 7, 10, 11 |
| ⋮ |

METHOD AND APPARATUS FOR SEARCHING A ROUTE

BACKGROUND OF THE INVENTION

1. Field of the Invention

The present invention relates to route searching methods an apparatus, and more particularly to a method and an apparatus for searching for the most suitable route between two arbitrarily specified points on certain road network data.

2. Description of the Background Art

In recent years, with the development of electronics, the navigation apparatus for guiding vehicles have spread rapidly. Some conventional navigation apparatus are equipped with a route searching apparatus for automatically searching for the most suitable route from a starting point to a destination (the shortest distance route or the minimum time route).

In the conventional route searching apparatus, known methods for obtaining the most suitable route for guiding vehicles include the automatic vehicle guiding method disclosed in Japanese Patent Laid-Open No.59-105113, for example. This method obtains the most suitable route between a starting point and a destination from road network data representing a network of roads by using the Dijkstra method, one of the optimum route determining methods. The theory of the Dijkstra method is described in "Data Structures and Algorithms" written by A. V. Aho et al. and translated by Yoshio Ono, Kabushiki Kaisha Baihu-kan, 1990, pp.179–183, for example.

When searching for the most suitable route between two arbitrary points on a network of roads according to the above-mentioned method, the time for obtaining the route increases as the numbers of intersections and roads included in the road network increase. As a result, the user must wait for a longer time (e.g., about two or three minutes), which leads to inconvenience.

Hence, like the route searching methods disclosed in Japanese Patent Laid-Open No.2-56591 and Japanese Patent Laid-Open No.3-54590, for example, there is a method which searches for the most suitable route by using map data having a hierarchical structure to reduce the calculating time. However, even when this method is used, there are limitations in the reduction of the time for searching the road network (about 30–60 seconds), and therefore further reduction of the searching time is demanded.

Accordingly, for the aim of reducing the searching operation, Japanese Patent Laid-Open No.4-204482 presents a method in which routes between individual intersections on a map are previously obtained and recorded. In this method, when a starting point and a destination are inputted, intersections near the points are searched for and the route between the searched intersections is retrieved and displayed. This method can show the route to a user by taking time only to retrieve the route between an intersection closest to the starting point and an intersection closest to the destination from the previously stored route data.

However, since the number of intersections in Japan, even only of those in networks of roads wide enough to allow vehicles to pass each other, i.e., 5.5 m or wider, amounts to about sixty-five thousand, it is absolutely impossible to record routes between all of the intersections. Even if the previously recorded routes are limited to main roads such as prefectural roads and national roads, the number of the intersections amounts to ten thousand or more in the entire country, so it is still difficult to record routes between all points.

SUMMARY OF THE INVENTION

Accordingly, an object of the present invention is to provide a method and an apparatus for searching for routes which can largely reduce the amount of previously stored route data and which can search for a route at once and show it to a user.

Another object of the present invention is to present a plurality of routes to a user at once and allow the user to select a route according to his/her preference.

The present invention has the following features to achieve the objects above.

A first aspect of the present invention relates to a method for searching for an optimum route between two arbitrarily specified points on certain road network data, which includes:

a first step of dividing the road network data into a plurality of road network areas;

a second step of obtaining, in advance, routes between two arbitrary road network areas for all of the road network areas divided in the first step and recording the obtained routes as route data into a route recording medium;

a third step of, when a starting point and a destination are specified, investigating to obtain two road network areas to which the individual points belong;

a fourth step of retrieving the route data corresponding to the combination of the two road network areas obtained in the third step from the route recording medium; and a fifth step of searching for a route from the starting point to the destination on the basis of the route data retrieved in the fourth step and presenting the route to a user.

As mentioned above, according to the first aspect, routes between two arbitrary road network areas are obtained in advance and recorded as route data. When a starting point and a destination are specified, the route data about the corresponding road network areas are retrieved and a route from the starting point to the destination is presented on the basis of the retrieved route data. Hence, the route can be searched for in an instant.

According to a second aspect, in the first aspect, the route searching method further includes a sixth step of previously producing map data for displaying a background and recording the map data into a map recording medium, wherein, in the fifth step, the map data corresponding to the route data retrieved in the fourth step is read from the map recording medium and displayed, and the searched route is displayed over the displayed map data.

As mentioned above, according to the second aspect, the route searched for on the basis of the route data is superimposed over a background (configurations of roads, buildings, water areas, etc.) displayed with the map data. Accordingly, the route can be displayed along roads on the map, which is easier to understand than a display showing the route only.

According to a third aspect, in the second aspect, the route data recorded in the route recording medium includes road specifying data for specifying a road corresponding to each route on the map data, wherein, in the fifth step, the searched route is displayed over the road on the map data specified by the road specifying data.

As mentioned above, according to the third aspect, the route data includes road specifying data indicating correspondence to roads on the map data. Accordingly, the route can be displayed without deviating from configurations of the roads on the map.

According to a fourth aspect, in the second aspect, the route data recorded in the route recording medium includes image data for displaying routes, wherein, in the fifth step, the image data is displayed over the map data.

As mentioned above, according to the fourth aspect, since the route data is stored in the form of image data indicating configurations of the routes, it is not necessary to relate the route data and the map data when displaying a route. Accordingly, the route can be merely superimposed on the background map, enabling a high-speed display of the route.

According to a fifth aspect, in the second aspect, the map data is produced by extracting roads corresponding to the routes between the road network areas obtained in the second step and the related roads from the road network data.

As mentioned above, according to the fifth aspect, when displaying a route, it is possible to display a rough map formed only of roads related to the route as a background. This enables simple and easy-to-understand display of background without complicated by unrelated roads.

According to a sixth aspect, in the second aspect, in the map data, a plurality of partial map data required when displaying a route between two road network areas are collected together in advance for each combination of the road network areas, and the plurality of collected partial map data are recorded in the map recording medium in an interrelated manner so that the data can be read by a single access operation.

As mentioned above, according to the sixth aspect, the map data are stored in a group for each combination of retrieved road network areas. Accordingly, when displaying a route, the map data can be collectively read in a single accessing operation, which enables high-speed display of the background.

According to a seventh aspect, in the first aspect, the route data recorded in the route recording medium includes image data for displaying both of the routes and a map forming a background, and in the fifth step, the image data in the route data retrieved in the fourth step is displayed as it is.

As mentioned above, according to the seventh aspect, the route data is stored in the form of image data for displaying a route and its background map. Accordingly, the route can be displayed at high speed without separately using map data.

According to an eighth aspect, in the first aspect, the fifth step comprises, an eighth step of searching, in the vicinity of the starting point, for a first connecting route from the starting point to the route in the route data retrieved in the fourth step on the basis of the road network data, a ninth step of searching, in the vicinity of the destination, for a second connecting route from the destination to the route in the route data retrieved in the fourth step on the basis of the road network data, a tenth step of producing the entire route from the starting point to the destination by using the first and second connecting routes searched for in the eighth and ninth steps and the route in the route data retrieved in the fourth step, and an eleventh step of displaying the entire route produced in the tenth step.

As mentioned above, according to the eighth aspect, connecting routes in the vicinities of the starting point and the destination are searched for on the basis of the road network data, and the route from the starting point to the destination through the route searched for between the road network areas is interpolated by using the connecting routes. This provides a route without disconnection from the starting point to the destination.

According to a ninth aspect, in the eighth aspect, the route data recorded in the route recording medium further includes information about a boundary point at which each route intersects a road network area, wherein in the eighth step, routes are searched for from the starting point to all boundary points of the road network area to which the starting point belongs, and in the ninth step, routes are searched for from the destination to all boundary points of the road network area to which the destination belongs.

As mentioned above, according to the ninth aspect, the search is made in the vicinities of the starting point and the destination to obtain routes to the boundary points of the corresponding road network areas. Accordingly, the connecting routes can be connected to the retrieved route between the road network areas immediately after the search.

According to a tenth aspect, in the first aspect, in the second step, one or a plurality of routes are obtained between the road network areas and the obtained routes are recorded as the route data into the route recording medium, and the fifth step includes, a twelfth step of displaying the one or plurality of route(s) on the basis of the route data retrieved in the fourth step, and a thirteenth step of selecting, when a plurality of routes are displayed in the twelfth step, one of the plurality of routes in response to an operation by a user.

As mentioned above, according to the tenth aspect, a plurality of routes are obtained in advance between two road network areas, and when searching for a route, the user is prompted to select one of the plurality of routes. Then the route can be selected according to user's preference.

According to an eleventh aspect, in the tenth aspect, the fifth step further includes, a fourteenth step of searching for a first connecting route from the starting point to the route selected in the thirteenth step in the vicinity of the starting point on the basis of the road network data, a fifteenth step of searching for a second connecting route from the destination to the route selected in the thirteenth step in the vicinity of the destination on the basis of the road network data, and a sixteenth step of producing the entire route from the starting point to the destination by using the first and second connecting routes searched for in the fourteenth and fifteenth steps and the route selected in the thirteenth step.

As mentioned above, according to the eleventh aspect, connecting routes in the vicinities of the starting point and the destination are searched for on the basis of the road network data, and the intervals between the starting point and the destination and the selected route between the road network areas are interpolated by using the connecting routes. This provides a route without disconnection from the starting point to the destination.

According to a twelfth aspect, in the eleventh aspect, the route data recorded in the route recording medium further includes information about a boundary point at which each route intersects a road network area, wherein the fourteenth step includes a seventeenth step of searching for routes from the starting point to all boundary points of the road network area to which the starting point belongs, and the fifteenth step includes an eighteenth step of searching for routes from the destination to all boundary points of the road network area to which the destination belongs.

As mentioned above, according to the twelfth aspect, the search in the vicinities of the starting point and the destination is made to obtain routes to the boundary points of the corresponding road network areas. Accordingly, the connecting routes can be connected to the retrieved route between the road network areas immediately after the search.

According to a thirteenth aspect, in the twelfth aspect, the seventeenth and eighteenth steps are performed while the user is selecting one route from among the plurality of displayed routes in the thirteenth step.

As mentioned above, according to the thirteenth aspect, the vicinities of the starting point and the destination are searched while the user is selecting a favorite route from among the plurality of routes. Accordingly, a detailed route from the starting point to the destination can be presented immediately after the user has selected the route.

According to a fourteenth aspect, in the first aspect, the first step includes, a nineteenth step of dividing the road network data into road network areas of minimum units, and a twentieth step of dividing the road network data into road network areas of collective units each including a plurality of minimum units, and the second step includes, a twenty-first step of searching for two of the minimum-unit road network areas as a target, a twenty-second step of, when the distance between the minimum-unit road network areas searched for in the twenty-first step is shorter than a predetermined distance, obtaining a route between the searched minimum-unit road network areas and recording the obtained route as the route data into the route recording medium, and a twenty-third step of, when the distance between the minimum-unit road network areas searched for in the twenty-first step is longer than the predetermined distance, obtaining a route between the collective-unit road network areas to which the searched minimum-unit road network areas belong, and recording the obtained route as the route data into the route recording medium, the twenty-first to twenty-third steps being repeatedly performed, wherein the third step includes, a twenty-fourth step of, when the distance between the specified starting point and the destination is shorter than a predetermined distance, investigating to obtain the minimum-unit road network areas to which the individual points belong, and a twenty-fifth step of, when the distance between the specified starting point and the destination is longer than the predetermined distance, investigating to obtain the collective-unit road network areas to which the individual points belong.

As mentioned above, according to the fourteenth aspect, the size of the road network areas used to obtain a route is changed depending on the distance. This reduces the number of combinations of road network areas used to obtain the route, which remarkably reduces the amount of the route data to be recorded.

A fifteenth aspect relates to an apparatus for searching for an optimum route between two arbitrarily specified points on certain road network data, wherein the road network data is divided into a plurality of road network areas and routes between two arbitrary road network areas are obtained in advance for each road network area, and the route searching apparatus includes, a route storing portion for storing the routes obtained between the road network areas as route data, an area investigating portion for, when searching for a route from a specified starting point to a destination, searching for two of the road network areas to which the individual points belong, a route retrieving portion for retrieving, from the route storing portion, the route data corresponding to the combination of the two road network areas obtained by the area investigating portion, and a route presenting portion for searching for a route from the starting point to the destination on the basis of the route data retrieved by the route retrieving portion and presenting the route to a user.

As mentioned above, according to the fifteenth aspect, routes between two arbitrary road network areas are obtained in advance and stored as route data. When a starting point and a destination are specified, the route data about the corresponding road network areas are retrieved and a route from the starting point to the destination is presented on the basis of the retrieved route data, which enables search of the route in an instant.

A sixteenth aspect relates to a method for searching for an optimum route between two arbitrarily specified points on certain road network data, wherein the road network data is divided into a plurality of road network areas in advance, and routes between the individual road network areas are searched for in advance, wherein when a starting point and a destination are specified, a route between two of the road network areas to which the individual points belong is acquired from the previously searched results, and routes between the starting point and the destination and the acquired route between the road network areas are interpolated by performing a search on the basis of the road network data.

A seventeenth aspect relates to a recording medium recording a program executed on a computer device for searching for an optimum route between two arbitrarily specified points on certain road network data, wherein the road network data is divided into a plurality of road network areas in advance, and routes between the road network areas are searched for in advance, wherein the program comprises, a first program step of acquiring, when a starting point and a destination are specified, a route between two of the road network areas to which the individual points belong from the previously searched results, and a second program step of interpolating the intervals between the starting point and the destination and the route between the road network areas obtained in the first program step by performing a search on the basis of the road network data.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 16A–16D are diagrams showing examples of arrangements of the map data on a storage device used in the second embodiment.

DESCRIPTION OF THE PREFERRED EMBODIMENTS

Figure 1:
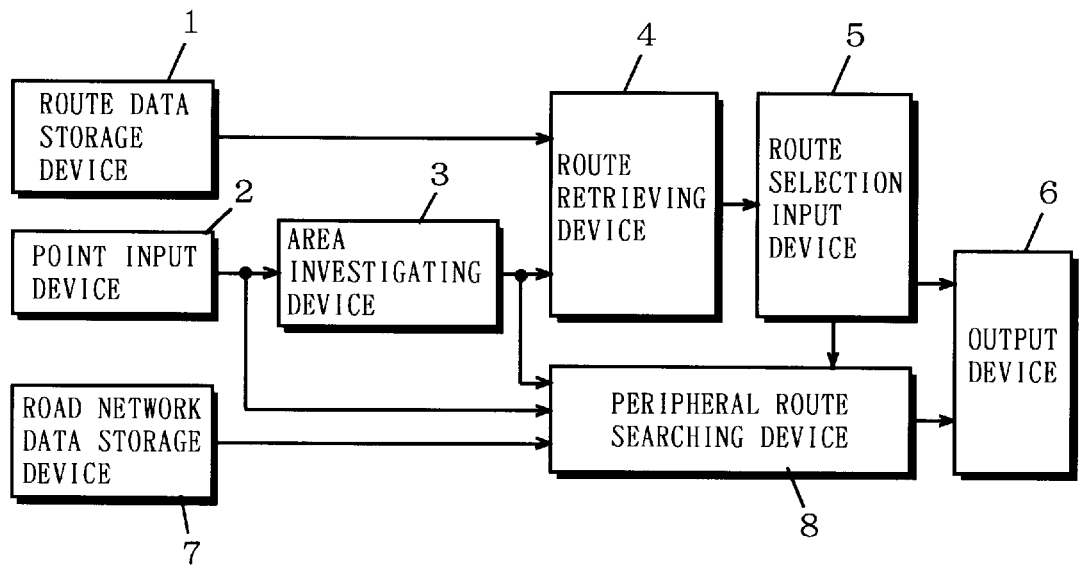
FIG. 1 is a block diagram showing a structure of a route searching apparatus according to a first embodiment of the present invention.

FIG. 1 is a block diagram of a route searching apparatus according to an embodiment of the present invention. In FIG. 1, the route searching apparatus of this embodiment includes a route data storage device 1, a point input device 2, an area investigating device 3, a route retrieving device 4, a route selection input device 5, an output device 6, a road network data storage device 7, and a peripheral route searching device 8.

The route data storage device 1 includes a storage medium such as a CD-ROM or a DVD, which contains route data for describing a plurality of patterns of routes possibly used when moving between two arbitrary of areas divided on a map. The route data will be fully explained later.

The point input device 2 operates in response to an operation by a user to obtain coordinates of a starting point and a destination of a route to be obtained (if required, it automatically inputs the present position of a vehicle as a starting point, for example) and outputs the data to the area investigating device 3 and the peripheral route searching device 8.

The area investigating device 3 investigates the positional coordinates of the starting point and the destination inputted from the point input device 2 to obtain road network areas to which the individual points belong. Then the area investigating device 3 outputs both of the road network area to which the starting point belongs and the road network area to which the destination belongs to the route retrieving device 4 and the peripheral route searching device 8. The method of setting the road network areas will be fully described later.

The route retrieving device 4 retrieves route data corresponding to the combination of the road network areas of the starting point and the destination inputted from the area investigating device 3 from the data stored in the route data storage device 1. Then the route retrieving device 4 outputs the retrieved route data to the route selection input device 5.

The route selection input device 5 outputs the route data inputted from the route retrieving device 4 to the output device 6. The route selection input device 5 then prompts the user to select one of a plurality of routes included in the route data and outputs the result to the peripheral route searching device 8.

The output device 6 includes a display, a speaker, and the like, which displays and outputs image data and voice information provided from the route selection input device 5 and the peripheral route searching device 8.

The road network data storage device 7 includes a recording medium such as a CD-ROM or a DVD, which contains road network data used to search for a shortest route between arbitrary two points. The road network data will be fully explained later.

On the basis of the road network data stored in the road network data storage device 7, the peripheral route searching device 8 searches for the shortest routes from the starting point inputted from the point input device 2 to individual points existing in the road network area inputted from the area investigating device 3 to which the starting point belongs. That is to say, starting from the starting point, the peripheral route searching device 8 conducts the processing of enlarging the search area until it finally obtains the routes to all points in the road network area by using the Dijkstra method, for example. The peripheral route searching device 8 then obtains the shortest routes from the starting point to the points in the road network area.

Similarly, the peripheral route searching device 8 searches for the shortest routes from individual points existing in the road network area inputted from the area investigating device 3 to which the destination belongs to the destination inputted from the point input device 2. That is to say, the peripheral route searching device 8 enlarges the search area starting from the destination to all points in the road network area by using the Dijkstra method, for example. The peripheral route searching device 8 then obtains the shortest routes from the points to the destination.

The peripheral route searching device 8 performs the searching processing while the user is selecting a favorite route with the route selection input device 5. After that, the peripheral route searching device 8 receives the selected route from the route selection input device 5. The peripheral route searching device 8 then obtains the route connecting from the starting point to the point related to the selected route on the basis of the results of the search made in the vicinity of the starting point. The peripheral route searching device 8 also obtains the route connecting from the point related to the selected route to the destination on the basis of the results of the search made in the vicinity of the destination.

Finally, the peripheral route searching device 8 connects the route connecting from the starting point to the start point of the selected route, the selected route, and the route connecting from the end of the selected route to the destination into one to produce the route from the starting point to the destination and outputs the route to the output device 6.

Next, the contents of the route data and the road network data used in the above embodiment will be explained.

Figure 2:
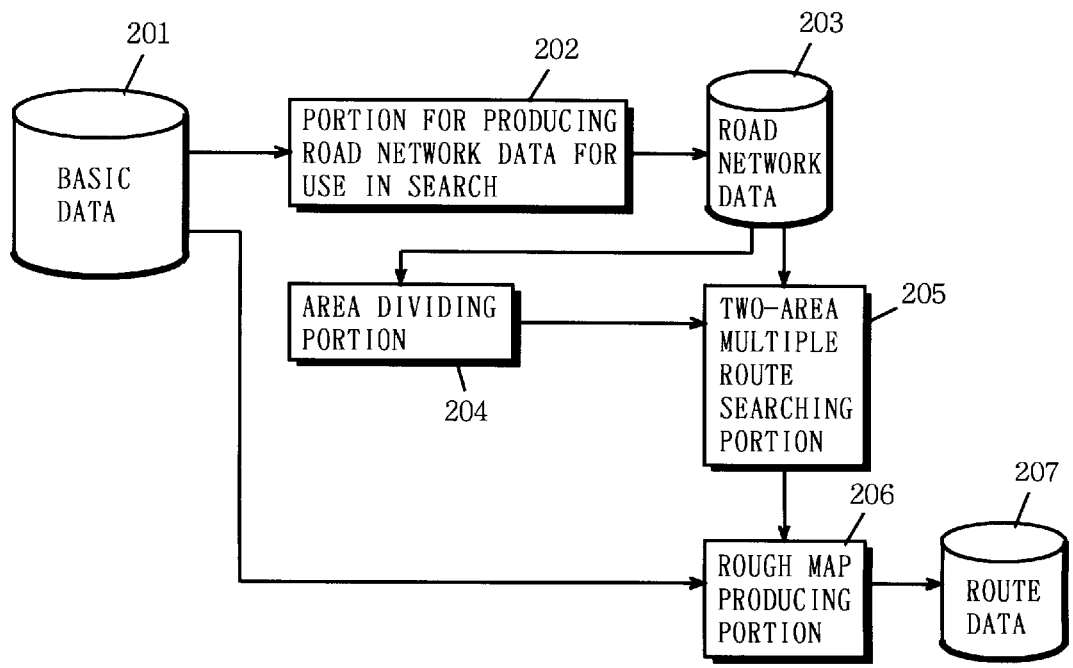
FIG. 2 is a diagram for illustrating the procedure of producing road network data and route data used in the first embodiment.
Figure 3:
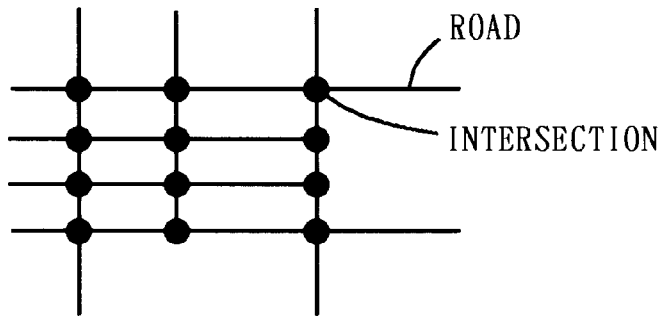
FIG. 3 is a diagram showing an example of the road network data used in the first embodiment.

First, referring to FIG. 2, the method of producing the road network data stored in the road network data storage device 7 of FIG. 1 will be described. The storage medium 201 contains basic data including information about the network of roads, such as configurations of roads, positions of intersections, connections among the roads, etc., and information about shapes of coasts, rivers, buildings, etc. The portion 202, for producing road network data for use in search, produces road network data used in the route search in the peripheral route searching device 8 on the basis of the basic data stored in the storage medium 201. The produced road network data is stored in the storage medium 203. The road network data includes, as shown in FIG. 3, information about intersections (nodes) and information about roads (links) connecting the intersections.

Figure 4:
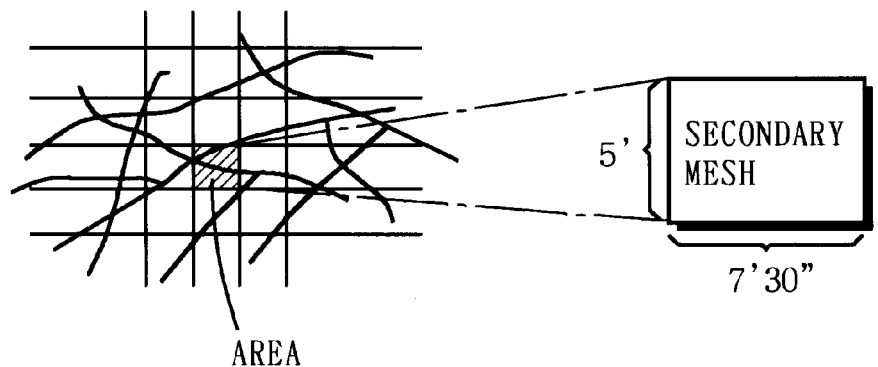
FIG. 4 is a diagram for explaining an example of area division of the road network data.

Next, referring to FIG. 2, the method of producing the route data stored in the route data storage device 1 of FIG. 1 will be explained. First, the area dividing portion 204 determines areas divided on the road network on the basis of the road network data stored in the storage medium 203. That is to say, as shown in FIG. 4, the area dividing portion 204 divides the road network data into a plurality of road network areas in certain longitude and latitude units (e.g., secondary mesh unit=latitude 5'×longitude 7'30"≈9 km in length×11 km in width). Next, the two-area multiple route searching portion 205 obtains a plurality of patterns of routes between the individual divided road network areas by using the road network data stored in the storage medium 203. At this time, the two-area multiple route searching portion 205 obtains, as the plurality of patterns of routes, minimum travel time routes, minimum distance routes, routes using no toll roads, routes using the least possible number of roads which other routes pass through, for example. (This will be fully described later.)

Next, from the basic data in the storage medium 201, the rough map producing portion 206 acquires configurations of roads and shapes of buildings of the areas which are related when displaying the plurality of routes between the two road network areas obtained in the two-area multiple route searching portion 205, and then it produces image data for displaying the routes. The image data is produced for each combination of two road network areas.

Figure 5A:
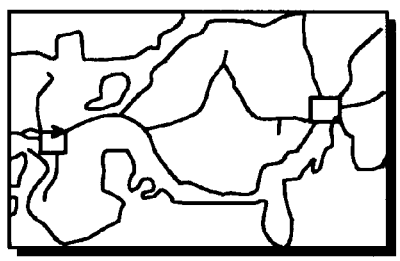
FIGS. 5A–5B are diagrams illustrating the contents of the rough map.
Figure 5B:
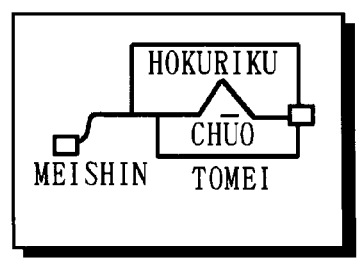

Preferably, to increase the visibility of the user, the image data forms a rough map which ignores actual configurations of the roads and positional relations between the roads, but which just describes the roads through which the routes pass and the related roads, for example. As examples, FIG. 5 shows rough maps for displaying three patterns of routes using the Tomei (Tokyo-Nagoya) Expressway, the Chuo (Central) Expressway, and the Hokuriku Expressway between Osaka and Tokyo. FIG. 5(A) shows a rough map produced by extracting only the expressways related to the routes from among all roads. As shown in FIG. 5(A), displaying only the related road networks implements a simple and easy-to-understand display without complicated by unrelated small roads. FIG. 5(B) shows a rough map showing the routes with their positional relations changed. The example shown in FIG. 5(B) further improves the visibility of the user.

The image data produced in the rough map producing portion 206 is stored into the storage medium 207 as the route data, together with link data for defining the correspondence between the image data and the road network data.

Next, referring to FIG. 6, the method of searching for a plurality of routes between two arbitrary areas in the two-area multiple route searching portion 205 will be described.

Figure 6A:
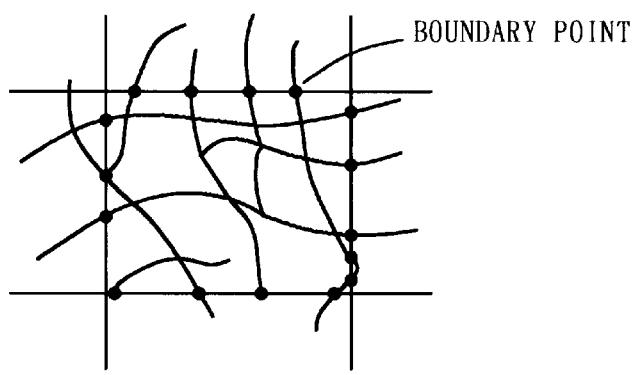
FIGS. 6A–6D are diagrams for illustrating the contents of the route data used in the first embodiment.
Figure 6B:
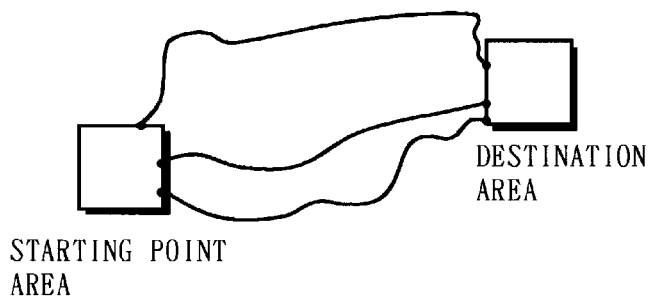

First, a road network area used as an object of the route search on the starting side (hereinafter referred to as a starting point area) is determined. Next, as shown in FIG. 6(A), intersections of roads extending over the boundary of the starting point area and the boundary (hereinafter referred to as boundary points) are searched for. Next, a road network area used as an object of the route search on the destination side (hereinafter referred to as a destination area) is determined and the boundary points of this destination area are searched for, as well. Then, by using the road network data stored in the storage medium 203, routes are searched for simultaneously starting from all of the boundary points of the starting point area to any of the boundary points of the destination area. The conditions in this search are variously changed depending on the needs required for the apparatus, e.g., minimum travel time conditions, minimum distance conditions, and the like. Next, as shown in FIG. 6(B), the plurality of obtained routes are stored corresponding to the combination of the starting point area and the destination area.

Figure 7A:
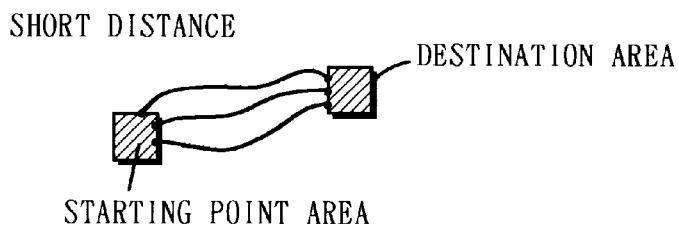
FIGS. 7A–7C are diagrams for describing that the size of the road network areas is changed depending on the distance in the first embodiment.
Figure 7B:
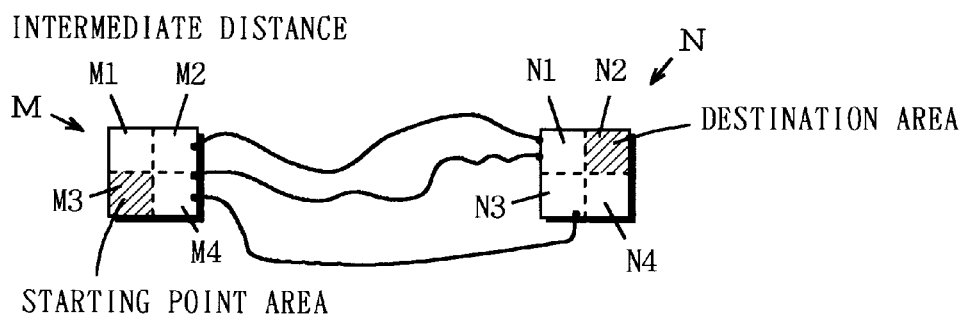
Figure 7C:
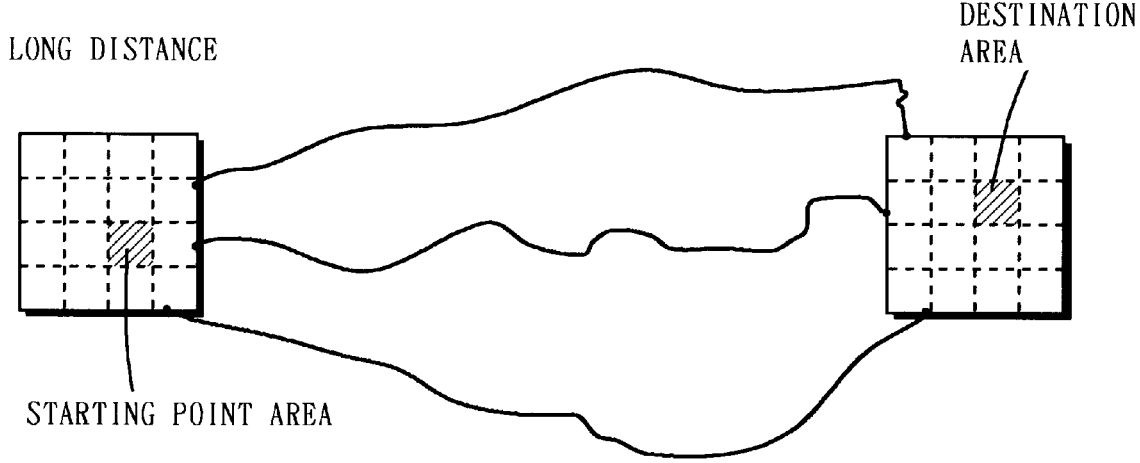

In this embodiment, as shown in FIG. 7, the size of the road network areas subjected to the route search is changed depending on the distance between the starting point and the destination. That is to say, as shown in FIG. 7(A), when the distance D between the central points in the starting point area and the destination area corresponds to a short distance shorter than a predetermined distance α (when D<α), the routes are searched for between the areas divided in the area dividing portion 204 shown in FIG. 2. As shown in FIG. 7(B), when the distance D between the central points in the starting point area and the destination area corresponds to an intermediate distance equal to or longer than the distance α and smaller than a predetermined distance β (β>α) (when α≦D<β), four areas are defined as one intermediate area, for example, and the routes are searched for between the two intermediate-distance areas. When the distance D between the central points in the starting point area and the destination area corresponds to a long distance equal to or larger than the distance β (when D≧β) as shown in FIG. 7(C), 16 areas are defined as one long-distance area, for example, and the routes are searched for between the two long-distance areas. Between the intermediate-distance areas or between the long-distance areas, the routes of all road networks belonging to the areas may be collected together. Hence, this route search can largely reduce the amount of the route data stored in the storage medium 207. For example, in the case of FIG. 7(B), when the routes to the road network areas N1–N4 on the destination side are obtained for each of the road network areas M1–M4 on the starting point side, 16 sets of route data are produced. However, when the road network areas M1–M4 on the starting point side are united into one intermediate-distance area M and the road network areas N1–N4 on the destination side are united into one intermediate-distance area N, the route data between the starting point areas M1–M4 and the destination areas N1–N4 are united into one.

Figure 11:
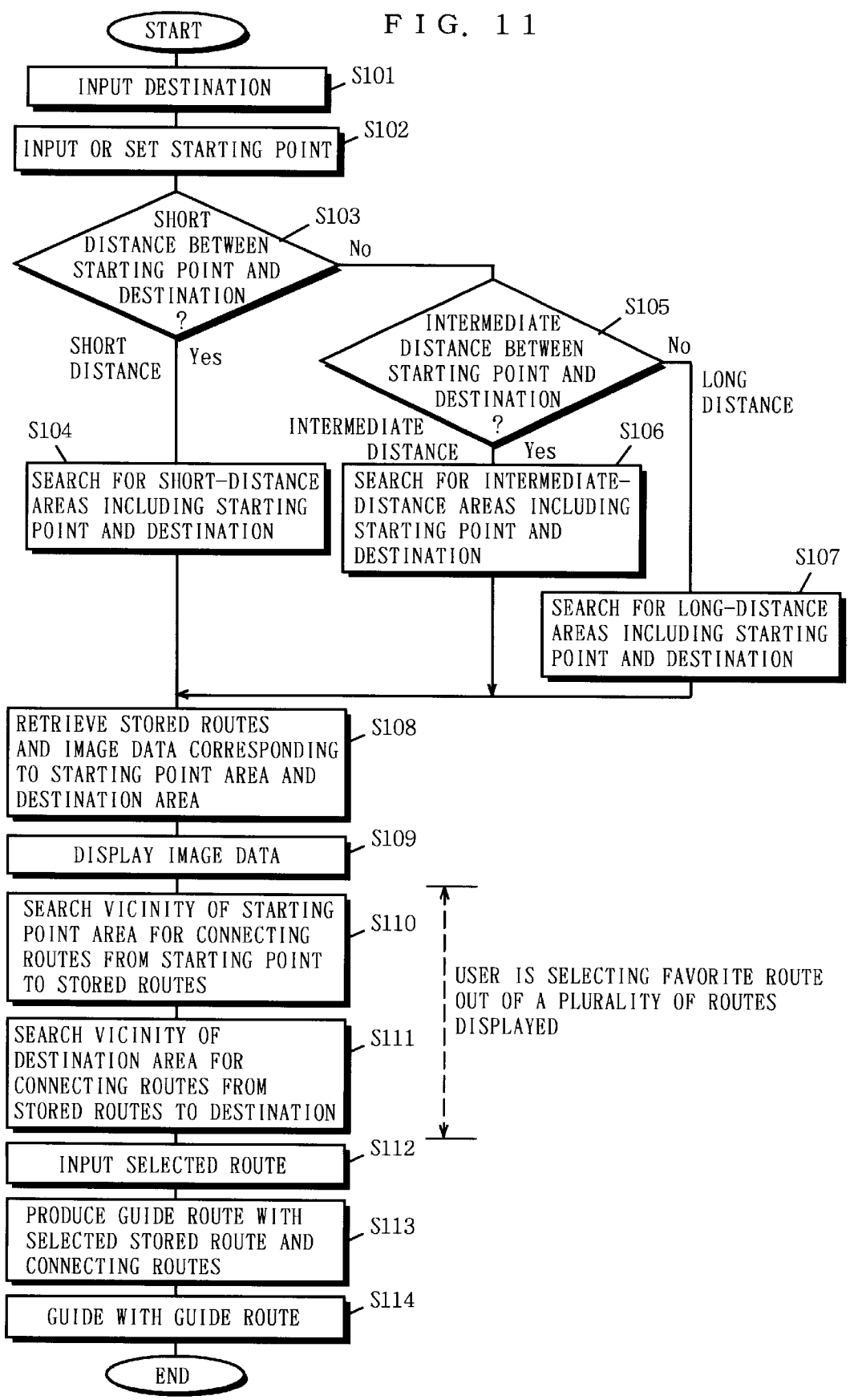
FIG. 11 is a flowchart for illustrating the operation of the route searching apparatus of the first embodiment.

FIG. 11 is a flowchart showing the operation of the route searching apparatus shown in FIG. 1. Referring to FIG. 11, the operation of the route searching apparatus of FIG. 1 will now be described.

First, the user inputs a starting point and a destination by using the point input device 2 (steps S101, S102). As to the starting point, instead of requiring the user to provide an input, the present position of the vehicle may be automatically set as the starting point by separately using a function of detecting the present position of the vehicle, for example.

Next, the area investigating device 3 investigates the distance between the inputted starting point and destination to determine which of the predetermined short distance, intermediate distance and long distance the distance belongs to (steps S103, S105). Next, the area investigating device 3 investigates to see to which road network areas the starting point and the destination belong, from the coordinates of the starting point and the destination (steps S104, S106, S107). At this time, when the distance D between the starting point and the destination corresponds to the short distance shorter than the predetermined distance $\alpha$ (when D<$\alpha$), the area investigating device 3 investigates the short-distance areas to which the starting point and the destination belong (step S104). When the distance D between the starting point and the destination corresponds to the intermediate distance equal to or larger than the distance $\alpha$ and smaller than the predetermined distance $\beta$ ($\beta$>$\alpha$) (when $\alpha \leq$ D<$\beta$), it investigates the intermediate-distance areas to which the starting point and the destination belong (step S106). When the distance D between the starting point and the destination corresponds to the long distance equal to or larger than the distance $\beta$ (when D$\geq \beta$), it investigates the long-distance areas to which the starting point and the destination belong (step S107).

Next, on the basis of the combination of the starting point area and the destination area obtained by the area investigating device 3, the route retrieving device 4 retrieves and reads route data corresponding to the combination from the route data storage device 1 (step S108). At this time, the route retrieving device 4 outputs the route data read from the route data storage device 1 to the route selection input device 5.

Figure 8:
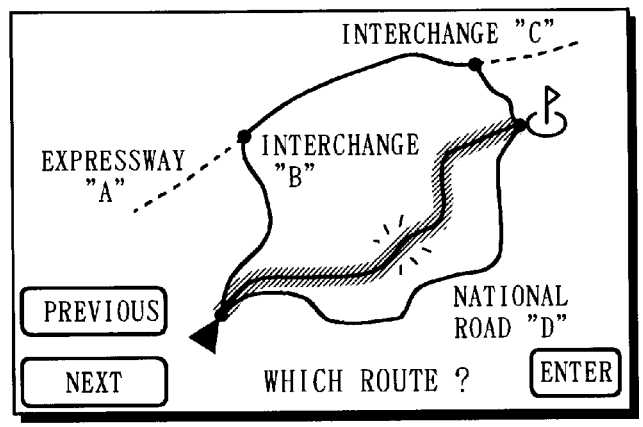
FIG. 8 is a diagram showing an example of a display made when the user selects one of a plurality of routes.

Next, as shown in FIG. 8, the route selection input device 5 shows (displays) a rough map showing the routes between the corresponding road network areas to the user by using the output device 6 on the basis of the image data in the route data provided from the route retrieving device 4 (step S109). After that, the route selection input device 5 waits for the user to select one of the plurality of routes displayed. When the user has selected one of the plurality of routes, the route selection input device 5 determines the selected route as the final route.

Figure 9:
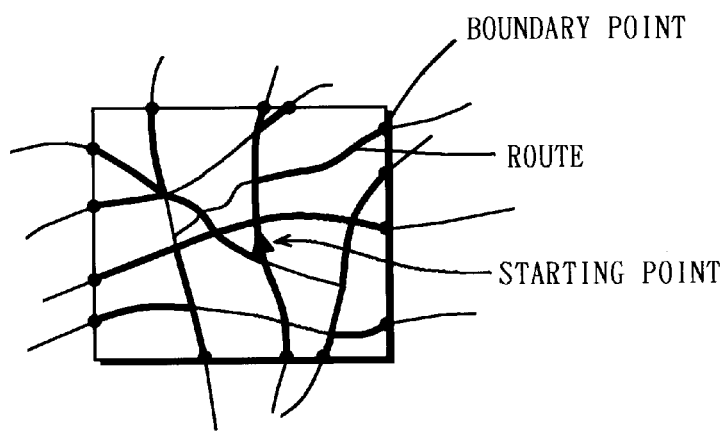
FIG. 9 is a diagram illustrating the operation of the route search in the vicinity of a starting point in the first embodiment.

While the route selection input device 5 is selecting one route from among the plurality of routes, the peripheral route searching device 8 searches the road network areas obtained by the area investigating device 3 in the vicinities of the starting point and the destination outputted from the point input device 2 (step S110, S111). For example, as shown in FIG. 9, the vicinity of the starting point is searched by reading the road network data contained in the starting point area from the road network data storage device 7 and searching for the shortest routes from the starting point to all of the boundary points of the starting point area. Similarly, starting from the destination, the shortest routes to the boundary points are searched for in the destination area.

Figure 10:
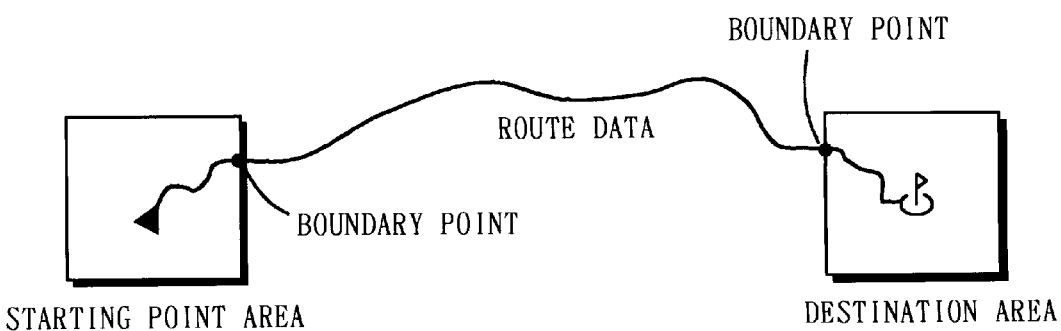
FIG. 10 is a diagram showing a result of search of a route between the starting point and the destination in the first embodiment.

Next, the peripheral route searching device 8 receives the above-mentioned final route from the route selection input device 5 (step S112). More specifically, the peripheral route searching device 8 receives, from the route selection input device 5, link data for relating the final route selected on the image data by the user to links or nodes on the road network data. Next, the peripheral route searching device 8 obtains the route (the peripheral route around the starting point) from the starting point to one end of the final route (i.e., a boundary point of the starting point area) from the results of the search performed before. Similarly, the peripheral route searching device 8 obtains the route (the peripheral route around the destination) from the other end of the final route (i.e., a boundary point of the destination area) to the destination from the results of the search performed before. Then, as shown in FIG. 10, the peripheral route searching device 8 unites the three routes (the peripheral route around the starting point, the final route, the peripheral route around the destination) into one as the route from the starting point to the destination (step S113) and shows the result to the user through the output device 6 (step S114).

In the embodiment, the point input device 2, the area investigating device 3, the route retrieving device 4, the route selection input device 5, the peripheral route searching device 8, the portion 202 for producing road network data for use in search, the area dividing portion 204, the two-area multiple route searching portion 205, and the rough map producing portion 206 may be all formed of hard circuits, or part or all of the functions may be realized with program processings of a computer. When part or all of the functions are realized with program processings with a computer, the software program may be supplied to the apparatus in the form of a recording medium such as a CD-ROM, a DVD, or a flexible disk, or may be supplied to the apparatus through a communication line.

In the embodiment, the peripheral route searching device 8 searches for the routes by using the Dijkstra method, but it may perform the route search by using another method. Although the road network data is read from the road network data storage device 7 before the search, the data may be read while searching, or the search may be made over the areas.

In the embodiment, the image data in the route data used for display is produced from the basic data, but a deformed map (e.g., a map drawn by a man) may be used, for example, and the route data may be stored with relating the image data thereto.

Furthermore, although the areas on the road network are divided in the area dividing portion 204 on the basis of coordinates in the above-described embodiment, they may be divided independently from the coordinates. For example, each of the intersections on the road network may be recorded with data indicating which of the road network areas it belongs to. When a starting point or a destination is set, the road network area can be specified by using the data recorded with a nearby intersection.

Moreover, in the above-described embodiment, the two-area multiple route searching portion 205 produces the route data by using all of the boundary points of the starting point area as the starting points of the search. However, the route data may be produced by using one point in the starting point area as a starting point, for example.

Figure 6C:
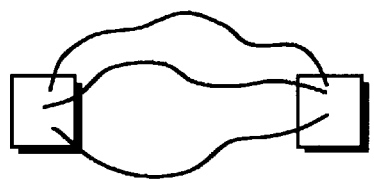
Figure 6D:
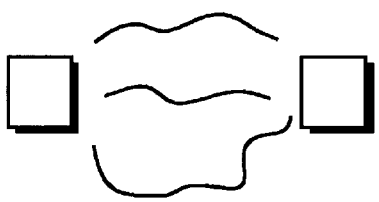

In the embodiment above, the two-area multiple route searching portion 205 produces the route data by searching for routes between the boundary points. However, the route data may be produced by searching for routes between points near the boundary points (e.g., nodes which are the closest to the boundary points on the road network data). In this case, the route data are produced as shown in FIG. 6(C) or FIG. 6(D). In this case, it is necessary for the peripheral route searching device 8 to make a search to certain search conditions until at least the points near the boundary points are included (e.g., to a 10 km area in the case of a short-distance route). In this case, the peripheral route searching device 8 may obtain routes connected not to the ends of the selected route but to some points on the route and reconfigure them with the selected route as the route from the starting point to the destination.

Figure 12:
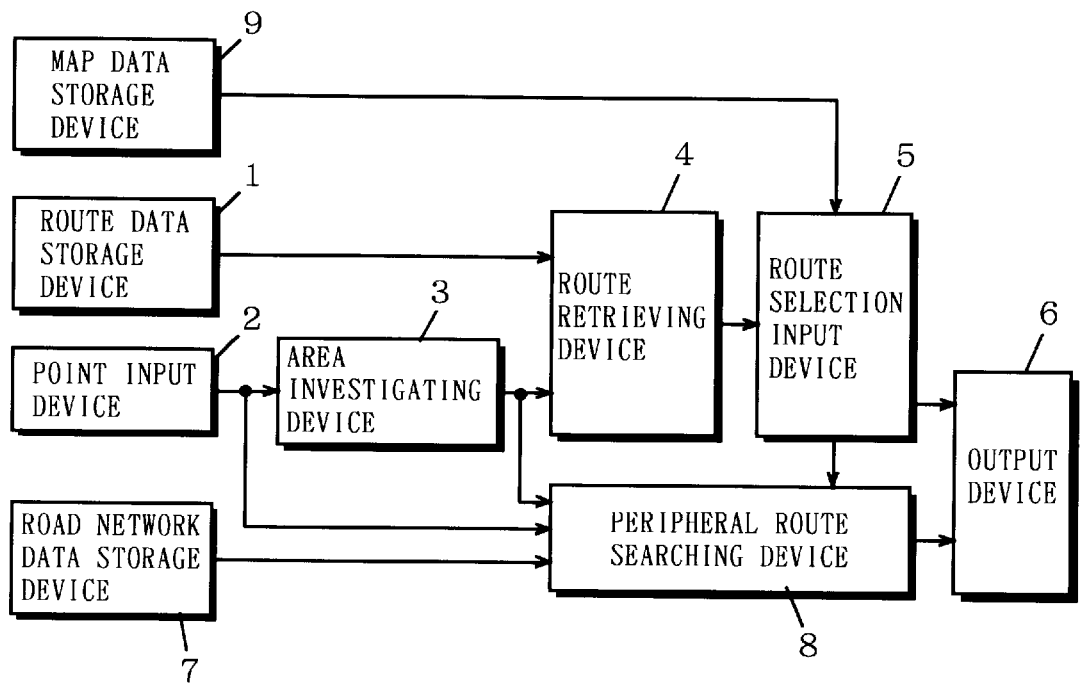
FIG. 12 is a block diagram showing a structure of a route searching apparatus according to a second embodiment.
Figure 13A:
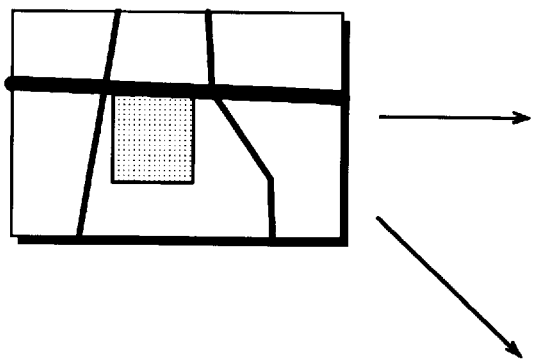
FIGS. 13A–13C are diagrams showing the contents of the route data used in the second embodiment.
Figure 13B:
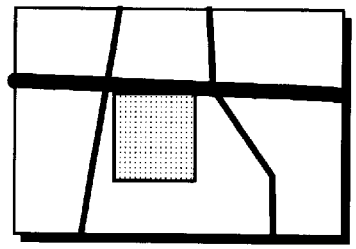
Figure 13C:
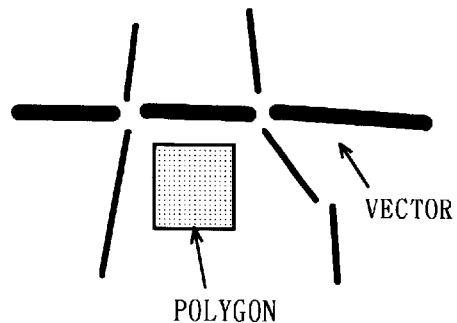

In the embodiment above, the image data for display are used as the route data. However, as shown in FIG. 12, a map data storage device 9 may be separately provided for storing map data for displaying background. In this case, road specifying data for specifying roads corresponding to the individual routes on the map data may be used as the route data. As the map data for displaying background, as shown in FIG. 13, the following two kinds of formats may be adopted, for example.

(1) Image data of bit-map format storing displayed images as they are.

(2) Vector data storing the background as lines, polygons, etc., and having a data structure indicating the vectors, polygons, etc.

When the map data of the format (1) is used, the road specifying data in the route data specifies numbers of the bits existing on the routes. When the map data of the format (2) is used, the road specifying data in the route data specifies numbers of the vectors along the routes.

Figure 14:
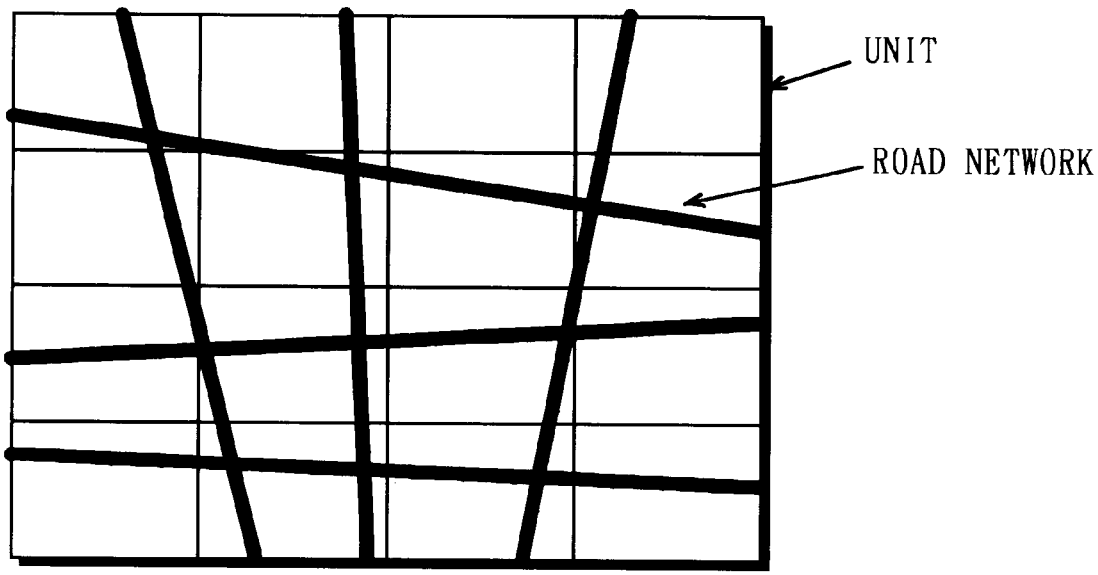
FIG. 14 is a diagram showing the map data divided into units.
Figure 15:
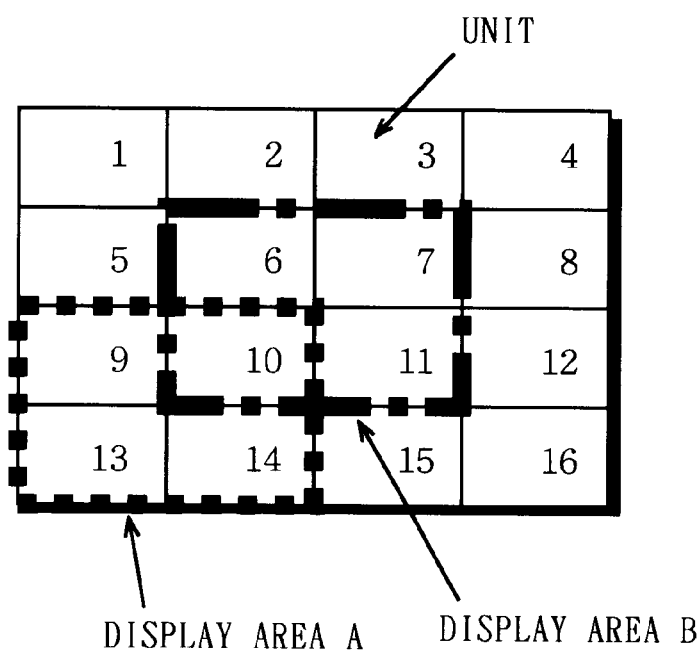
FIG. 15 is a diagram showing the division of the map data used in the second embodiment.

Usually, the map data is read from the map data storage device 9 only in portions required to make a display. Accordingly, as shown in FIG. 14, the map data is stored in the map data storage device 9 in the form previously divided into certain coordinate units or into certain data size units. This storage unit is called "a unit." When there are units as shown in FIG. 15, the units related to the display area A and the display area B are read from the map data storage device 9 as follows.

Generally, as shown in FIG. 16(A), the map data storage device 9 stores the map data in the order of the unit numbers without overlap to reduce the amount of the stored data. However, in this case, since the units 9, 10 and the units 13, 14 are stored in the separated locations (i.e., the units 11, 12 are interposed therebetween), it is necessary when displaying the display area A to read them by separate access operations. Similarly, with the display area B, the units 6, 7 and the units 10, 11 must be read with different accessing operations.

Accordingly, as shown in FIG. 16(B), the units required to display routes between road network areas may be collected in advance and the collected units may be stored in successive locations. Then, when displaying the display area A, for example, the necessary units 9, 10, 13, 14 can be read by one access operation, since they are stored in the successive locations. This reduces the time required to read the map data. For modification, as shown in FIG. 16(C), the overlapping units may be stored so that they can be shared in use, so as to reduce the amount of stored data. Furthermore, as shown in FIG. 16(D), map data of units required to make a display may be previously reconfigured into one unit so that the map data can be read at once and the display can be made without considering boundaries between the units.

In the case of the apparatus configuration of FIG. 12, the route retrieving device 4 searches the route data storage device 1 to read the route data (the road specifying data) corresponding to a combination of a starting point area and a destination area obtained in the area investigating device 3. The route selection input device 5 searches for and reads the units of the map data corresponding to the route data retrieved by the route retrieving device 4 from the map data storage device 9 and makes the output device 6 display the map data as a background. The route selection input device 5 displays the routes on the roads specified by the route data (road specifying data) retrieved by the route retrieving device 4.

While the invention has been described in detail, the foregoing description is in all aspects illustrative and not restrictive. It is understood that numerous other modifications and variations can be devised without departing from the scope of the invention.

What is claimed is:

1. A method for searching for an optimum route between two arbitrarily specified points on road network data, said method comprising:

dividing the road network data into a plurality of road network areas;

obtaining, in advance, routes between each of the plurality of road network areas obtained in said dividing the road network data, and recording the obtained routes as route data into a route recording medium;

investigating, when a starting point and a destination are specified, to obtain two road network areas from the plurality of road network areas to which the starting point and the destination respectively belong;

retrieving the route data which corresponds to a combination of the two road network areas obtained in said investigating from the route recording medium;

searching for a route from the starting point to the destination on a basis of the route data retrieved in said retrieving the route data and presenting the searched route to a user; and producing map data for displaying a background and recording the map data into a map recording medium;

wherein, in said searching for the route, the map data corresponding to the route data retrieved in said retrieving the route data is read from the map recording medium and displayed, and the searched route is displayed over the displayed map data; and wherein, in the map data, a plurality of partial map data required when displaying a route between two road network areas are collected together in advance for each combination of the road network areas, and the plurality of collected partial map data are recorded in the map recording medium in an interrelated manner so that the data can be read by a single access operation.

2. A method for searching for an optimum route between two arbitrarily specified points on road network data, said method comprising:

dividing the road network data into a plurality of road network areas;

obtaining, in advance, routes between each of the plurality of road network areas obtained in said dividing the road network data, and recording the obtained routes as route data into a route recording medium;

investigating, when a starting point and a destination are specified, to obtain two road network areas from the plurality of road network areas to which the starting point and the destination respectively belong;

retrieving the route data which corresponds to a combination of the two road network areas obtained in said investigating from the route recording medium; and searching for a route from the starting point to the destination on a basis of the route data retrieved in said retrieving the route data and presenting the searched route to a user;

wherein said searching for the route further comprises:
searching, in a vicinity of the starting point, for a first connecting route from the starting point to the route in the route data retrieved in said retrieving the route data on the basis of the road network data;

searching, in a vicinity of the destination, for a second connecting route from the destination to the route in the route data retrieved in said retrieving the route data on the basis of the road network data;

producing an entire route from the starting point to the destination by using the first and second connecting routes searched for in said searching for the first connecting route and said searching for the second connecting route and the route in the route data retrieved from said retrieving the route data; and displaying the entire route produced in said producing the entire route.

3. A route searching method as claimed in claim 2, wherein the route data recorded in the route recording medium further includes information about a boundary point at which each of the routes intersects a road network area;

wherein, in said searching for the first connecting route, routes are searched for from the starting point to all boundary points of the road network area to which the starting point belongs; and wherein, in said searching for the second connecting route, routes are searched for from the destination to all boundary points of the road network area to which the destination belongs.

4. A method for searching for an optimum route between two arbitrarily specified points on road network data, said method comprising:

dividing the road network data into a plurality of road network areas;

obtaining, in advance, routes between each of the plurality of road network areas obtained in said dividing the road network data, and recording the obtained routes as route data into a route recording medium;

investigating, when a starting point and a destination are specified, to obtain two road network areas from the plurality of road network areas to which the starting point and the destination respectively belong;

retrieving the route data which corresponds to a combination of the two road network areas obtained in said investigating from the route recording medium; and searching for a route from the starting point to the destination on a basis of the route data retrieved in said retrieving the route data and presenting the searched route to a user;

wherein, in said obtaining routes, at least one route is obtained between the road network areas and the obtained routes are recorded as the route data into the route recording medium; and wherein said searching for the route further comprises:
displaying the at least one obtained route on the basis of the route data retrieved in said retrieving the route data;

selecting, when the at least one obtained route is displayed in said displaying, one of the obtained routes in response to an operation by the user;

searching for a first connecting route from the starting point to the route selected in said selecting one of the obtained routes in a vicinity of the starting point on a basis of the road network data;

searching for a second connecting route from the destination to the route selected in said selecting one of the obtained routes in a vicinity of the destination on a basis of the road network data; and producing an entire route from the starting point to the destination by using the first and second connecting routes searched for in said searching for a first connecting route and said searching for a second connecting route and the route selected in said selecting one of the obtained routes.

5. A route searching method as claimed in claim 4, wherein the route data recorded in the route recording medium further comprises information about a boundary point at which each of the routes intersects a road network area;

wherein said searching for the first connecting route further comprises searching for routes from the starting point to all boundary points of the road network area to which the starting point belongs; and wherein said searching for the second connecting route further comprises searching for routes from the destination to all boundary points of the road network area to which the destination belongs.

6. A route searching method as claimed in claim 5, wherein said searching for routes from the starting point to all boundary points and said searching for routes from the destination to all boundary points are performed while the user is selecting the one route from among the obtained routes.

7. A method for searching for an optimum route between two arbitrarily specified points on road network data, said method comprising:

dividing the road network data into a plurality of road network areas;

obtaining, in advance, routes between each of the plurality of road network areas obtained in said dividing the road network data, and recording the obtained routes as route data into a route recording medium;

investigating, when a starting point and a destination are specified, to obtain two road network areas from the plurality of road network areas to which the starting point and the destination respectively belong;

retrieving the route data which corresponds to a combination of the two road network areas obtained in said investigating from the route recording medium; and searching for a route from the starting point to the destination on a basis of the route data retrieved in said retrieving the route data and presenting the searched route to a user;

wherein said dividing the road network data further comprises:
dividing the road network data into road network areas of minimum-units; and dividing the road network data into road network areas of collective units each including a plurality of the minimum-units;

wherein said obtaining routes comprises:
searching for two of the minimum-unit road network areas as a target;

obtaining, when the distance between the minimum-unit road network areas searched for in said searching for two of the minimum-unit road network areas is shorter than a predetermined distance, a route between the searched minimum-unit road network areas and recording the obtained route as the route data into the route recording medium; and obtaining, when the distance between the minimum-unit road network areas searched for in said searching for two of the minimum-unit road network areas is longer than a predetermined distance, a route between the collective-unit road network areas to which the searched minimum-unit road network areas belong, and recording the obtained route and the route data into the route recording medium;

wherein said searching for two of the minimum-unit road network areas, said obtaining a route between the searched minimum-unit road network areas, and said obtaining a route between the collective-unit road network areas are repeatedly performed; and wherein said investigating to obtain two road network areas further comprises:

investigating, when the distance between the starting point and the destination is shorter than the predetermined distance, to obtain the minimum-unit road network areas to which the starting point and the destination belongs; and investigating, when the distance between the starting point and the destination is longer than the predetermined distance, to obtain the collective-unit road network areas to which the starting point and the destination belongs.

* * * * *